US010968763B2

(12) United States Patent
Virkler (10) Patent No.: US 10,968,763 B2
(45) Date of Patent: Apr. 6, 2021

(54) HALO SEAL BUILD CLEARANCE METHODS (71) Applicant: UNITED TECHNOLOGIES CORPORATION, Farmington, CT (US)

(72) Inventor: Scott D. Virkler, Ellington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 162 days.

(21) Appl. No.: 16/265,664

(22) Filed: Feb. 1, 2019

(65) Prior Publication Data
US 2020/0248810 A1 Aug. 6, 2020

(51) Int. Cl.
F02C 7/28 (2006.01)
F16J 15/44 (2006.01)
F01D 11/00 (2006.01)
F01D 11/02 (2006.01)
F16J 15/10 (2006.01)

(52) U.S. Cl.
CPC .............. F01D 11/025 (2013.01); F02C 7/28 (2013.01); F16J 15/442 (2013.01); F16J 15/445 (2013.01); F01D 11/003 (2013.01); F05D 2240/55 (2013.01); F16J 15/108 (2013.01)

(58) Field of Classification Search
CPC ...... F16J 15/3288; F16J 15/442; F16J 15/445; F16J 15/447; F01D 11/02; F01D 11/025; F01D 11/08; F05D 2240/55; F05D 2240/56; F02C 7/28
See application file for complete search history.

(56) References Cited

U.S. PATENT DOCUMENTS

| 5,006,043 A * | 4/1991 | Katsumata ............ F04D 29/106 277/422 |
| 7,726,660 B2 * | 6/2010 | Datta ...................... F01D 11/02 277/411 |
| 8,740,225 B2 * | 6/2014 | Patterson ................ F01D 11/02 277/413 |
| 9,115,810 B2 * | 8/2015 | Bidkar ................... F16J 15/442 |
| 9,145,785 B2 * | 9/2015 | Bidkar ................... F01D 11/025 |
| 9,255,642 B2 * | 2/2016 | Bidkar ................... F04D 29/526 |
| 9,587,746 B2 * | 3/2017 | Bidkar ................... F16J 15/445 |
| 9,970,311 B2 | 5/2018 | Stevens et al. |
| 9,995,163 B2 | 6/2018 | Chuong et al. |
| 10,184,347 B1 * | 1/2019 | D'Ambruoso ......... F16J 15/442 |
| 10,422,431 B2 * | 9/2019 | Chuong .................. F01D 5/03 |
| 2006/0267291 A1 * | 11/2006 | Addis ................. F16J 15/3288 277/355 |

(Continued)

FOREIGN PATENT DOCUMENTS

EP 1568889 8/2005
EP 3290647 3/2018

OTHER PUBLICATIONS

European Patent Office, European Search Report dated Feb. 17, 2020 in Application No. 19212496.4.

Primary Examiner — Nicholas L Foster
(74) Attorney, Agent, or Firm — Snell & Wilmer L.L.P.

(57) ABSTRACT

A method for assembling a seal arrangement may comprise applying an adhesive to a seal, applying a force to a shoe of the seal, and removing the force from the shoe, wherein the adhesive secures the shoe with respect to a static structure in response to the force being removed.

17 Claims, 8 Drawing Sheets (56) References Cited

U.S. PATENT DOCUMENTS

| | | | |
|---|---|---|---|
| 2012/0223483 A1* | 9/2012 | Bidkar | F01D 11/025 |
| | | | 277/301 |
| 2012/0251290 A1* | 10/2012 | Turnquist | F01D 11/001 |
| | | | 415/1 |
| 2014/0008871 A1* | 1/2014 | Bidkar | F04D 29/164 |
| | | | 277/303 |
| 2014/0062024 A1* | 3/2014 | Bidkar | F16J 15/442 |
| | | | 277/303 |
| 2016/0115805 A1* | 4/2016 | Gibson | F01D 11/02 |
| | | | 415/173.5 |
| 2018/0347387 A1 | 12/2018 | Chuong | |
| 2019/0017607 A1* | 1/2019 | Chuong | F16J 15/445 |
| 2019/0024522 A1* | 1/2019 | D'Ambruoso | F01D 11/02 |
| 2019/0203842 A1* | 7/2019 | Bidkar | F16J 15/4476 |
| 2019/0368615 A1* | 12/2019 | Chuong | F01D 11/14 |
| 2020/0025006 A1* | 1/2020 | D'Ambruoso | F16J 15/3452 |
| 2020/0165929 A1* | 5/2020 | McCaffrey | F16J 15/442 |

\* cited by examiner

HALO SEAL BUILD CLEARANCE METHODS

U.S. GOVERNMENT RIGHTS

This invention was made with Government support under W911W6-16-2-0012 awarded by the United States Army. The Government has certain rights in this invention.

FIELD

This disclosure relates generally to seal assemblies for rotating members, and more particularly for systems and methods for installing a seal.

BACKGROUND

Gas turbine engines typically include a fan delivering air into a compressor and through a bypass duct. The air is compressed in the compressor and delivered downstream into a combustion section where it is mixed with fuel and ignited. Products of this combustion pass downstream over turbine rotors, driving the turbine rotors to rotate. The turbine rotors in turn rotate the compressors and fan.

The fan and compressor are typically driven by the turbine rotors via shafts. Seals may be provided adjacent the shafts. During engine assembly, the non-contact seal may have tight build gap clearance to the seal land. Tolerances of the parts and of assembly tools may cause this gap to be reduced or eliminated. This may result in damage to the non-contact seal shoes which may cause the seal to malfunction.

SUMMARY

A seal is disclosed, comprising a support ring, a shoe coupled to the support ring via an arm, and an adhesive disposed between the shoe and the support ring, wherein the adhesive secures the shoe with respect to the support ring.

In various embodiments, the adhesive is disposed between the arm and the support ring.

In various embodiments, the seal further comprises a stop extending from the support ring, wherein the adhesive is disposed between the shoe and the stop.

In various embodiments, the seal further comprises a shoe tab extending from the shoe, wherein the adhesive is disposed between the shoe tab and the support ring.

In various embodiments, the adhesive is a cyanoacrolate adhesive.

In various embodiments, the adhesive is configured to burn off at an elevated temperature to allow the shoe to move towards an inboard position.

A seal arrangement is disclosed, comprising a carrier ring, a seal coupled to the carrier ring, the seal comprising a support ring and a shoe coupled to the support ring via an arm, a seal ring coupled to the carrier ring and axially adjacent the seal, and an adhesive disposed between the support ring and the shoe, wherein the adhesive secures the shoe with respect to the support ring.

In various embodiments, the adhesive is disposed between the arm and the support ring.

In various embodiments, the seal arrangement further comprises a stop extending from the support ring, wherein the adhesive is disposed between the shoe and the stop.

In various embodiments, the seal arrangement further comprises a shoe tab extending from the shoe, wherein the adhesive is disposed between the shoe tab and the support ring.

In various embodiments, the adhesive is a cyanoacrolate adhesive.

In various embodiments, the adhesive is configured to burn off at an elevated temperature to allow the shoe to move towards an inboard position.

A method for assembling a seal arrangement is disclosed, comprising applying an adhesive to a seal, and applying a force to a shoe of the seal.

In various embodiments, the method further comprises removing the force from the shoe, wherein the adhesive secures the shoe with respect to a static structure in response to the force being removed.

In various embodiments, the seal comprises a support ring, the shoe coupled to the support ring via an arm, and a stop extending from the support ring, the adhesive is applied between the shoe and the stop.

In various embodiments, the seal comprises a support ring and the shoe coupled to the support ring via an arm, the adhesive is applied between the arm and the support ring.

In various embodiments, the seal comprises a support ring and the shoe coupled to the support ring via an arm, the adhesive is applied between the shoe and the support ring.

In various embodiments, the method further comprises applying heat to at least one of a carrier ring and a static support piece, and disposing the seal arrangement into the at least one of the carrier ring and the static support piece, wherein the heat is applied to at least one of the carrier ring and the static support piece prior to applying the adhesive to the seal.

In various embodiments, the seal arrangement includes the seal.

In various embodiments, the method further comprises disposing a rotating member adjacent the seal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "distal" refers to the direction radially outward, or generally, away from the axis of rotation of a turbine engine. As used herein, "proximal" refers to a direction radially inward, or generally, towards the axis of rotation of a turbine engine.

As used herein, "snap" refers to the process of placement of a first cylindrical component into a second cylindrical component, such that the second cylindrical component circumferentially surrounds the first component, wherein the outer diameter (OD) of the first component is greater than or equal to the inner diameter (ID) of the second component. In various embodiments, the first component may be pressed into the second component, thereby reducing the OD of the first component to tightly fit into the second component. In various embodiments, the OD of the first component may be decreased by decreasing the temperature of the first component before placing the first component into the second component. In various embodiments, the ID of the second component may be increased by increasing the temperature of the second component before placing the first component into the second component.

HALO seals are hydrostatic seals that use pressure to move a mechanical shoe towards and away from a rotating seal land. It may be desirable to not only have a tight a running clearance, but to also minimize the amount of travel of the shoe. HALO seal design includes balancing stress, deflection, producibility and frequencies which may be a tight design space. Minimizing travel requirements increase structural capability or in turn opens up the design space further. It may also be desirable to design a seal that has a low or close to zero mean stress thereby maximizing the alternating stress limit and further increasing design space. Tightening build clearances to balance these items may cause shoes to be built with an interference during installation.

The present disclosure provides a method of applying glue to one or more surfaces of a seal, and moving a shoe away from a rotating member so that a moveable member of the seal is secured (e.g., adhered) to a fixed member of the seal. Once dried, the shoes of the seal will be held in the secured position, opening the clearance between the seal and a rotating member (or seal land) and enabling assembly of the halo seal assembly over (or alternatively into) the rotating member and balancing of the built up assembly to occur. By utilizing an adhesive such as cyanoacrolate, the components remain fastened during room temperature balance operations but burn off cleanly at elevated temperatures (e.g., 400° F. (204.4° C.)), enabling the seal shoes to return to desired positions for operation.

Figure 1:
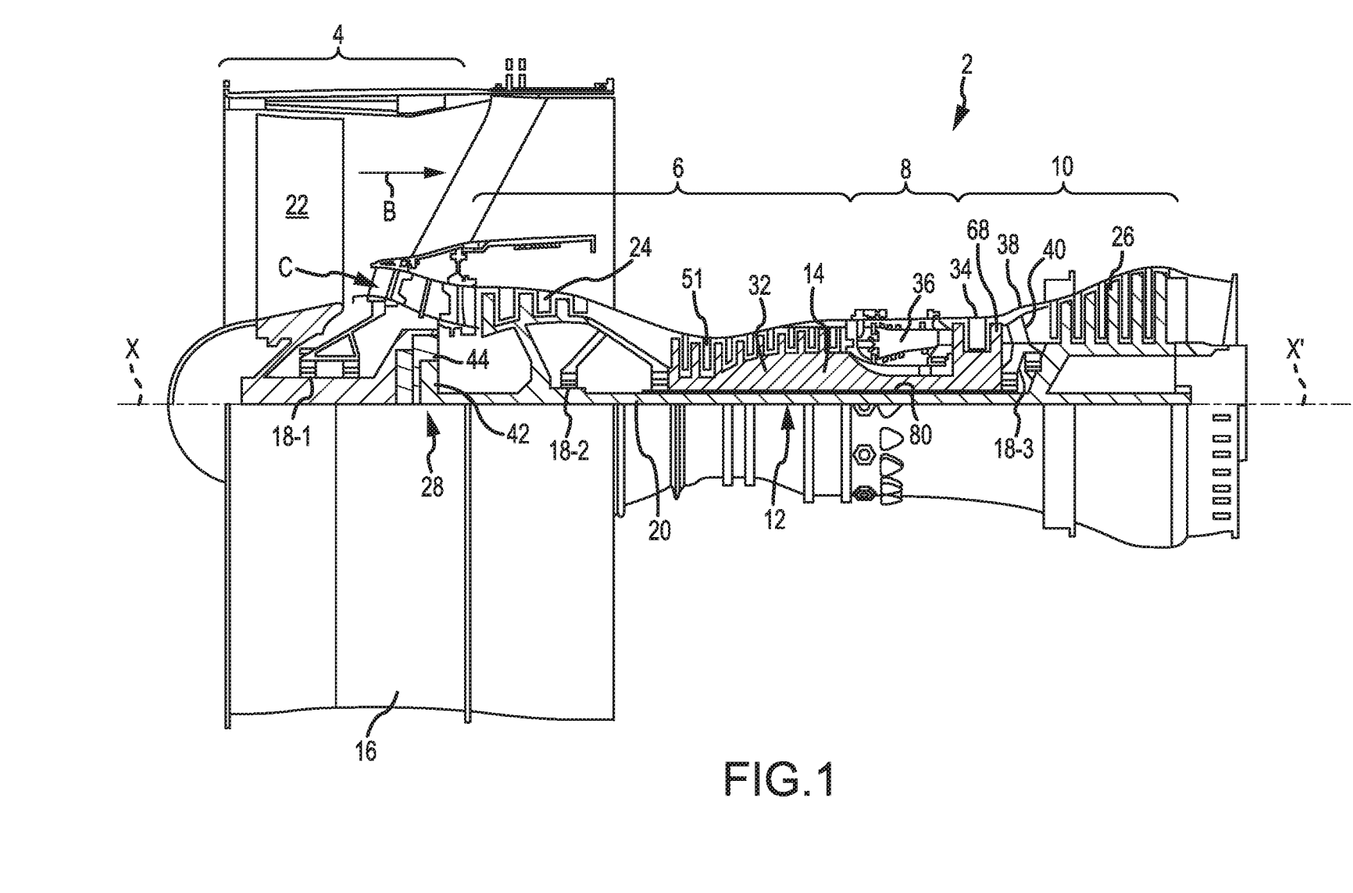
FIG. 1 illustrates a side cutaway view of a turbine engine, in accordance with various embodiments.

With reference to FIG. 1, an exemplary gas turbine engine 2 is provided, in accordance with various embodiments. Gas turbine engine 2 is a two-spool turbofan that generally incorporates a fan section 4, a compressor section 6, a combustor section 8 and a turbine section 10. Vanes 51 may be disposed throughout the gas turbine engine 2. In operation, fan section 4 drives air along a bypass flow-path B while compressor section 6 drives air along a core flow-path C for compression and communication into combustor section 8 then expansion through turbine section 10. A gas turbine engine may comprise an industrial gas turbine (IGT) or a geared aircraft engine, such as a geared turbofan, or non-geared aircraft engine, such as a turbofan, or may comprise any gas turbine engine as desired.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner rotating member 20 (also referred to herein as an inner shaft) that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer rotating member 80 (also referred to herein as an outer shaft) that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 are concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes surface structures 40, which are in the core airflow path. Turbines 26, 34 rotationally drive the respective low speed spool 12 and high speed spool 14 in response to the expansion.

An engine 2 may comprise a rotor blade 68 or a stator vane 51. Stator vanes 51 may be arranged circumferentially about the engine central longitudinal axis X-X'. Stator vanes 51 may be variable, meaning the angle of attack of the airfoil of the stator vane may be variable relative to the airflow proximate to the stator vanes 51. The angle of attack of the variable stator vane 51 may be variable during operation, or may be fixable for operation, for instance, being variable during maintenance or construction and fixable for operation. In various embodiments, it may be desirable to affix a variable vane 51 in fixed position (e.g., constant angle of attack).

Figure 4:
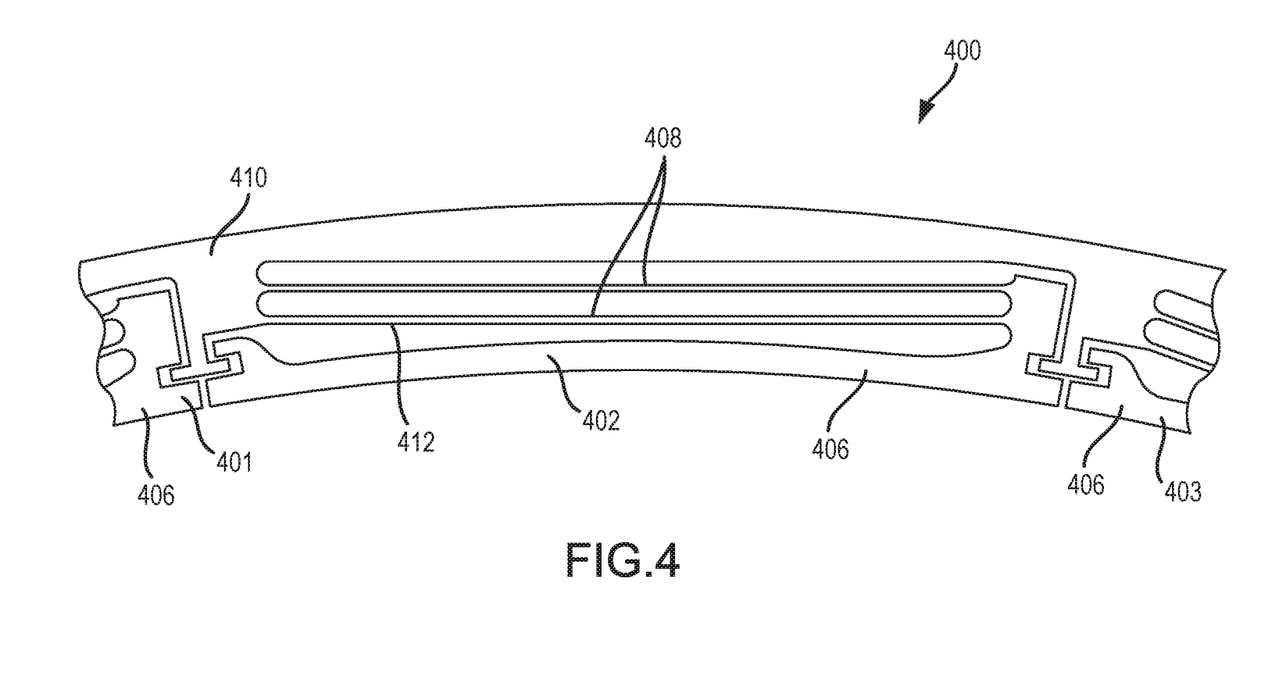
FIG. 4 illustrates an exemplary non-contact seal, in accordance with various embodiments.

A non-contact seal may be associated with the turbine section, the compressor section, or the fan section as illustrated in FIG. 1. FIG. 4 shows one example of a non-contact seal 400. The non-contact seal 400 as shown has shoes 406 and a support ring 410. In various embodiments, shoes 406 may be disposed radially inward from support ring 410. The support ring 410 and the shoes 406 are generally formed from a single piece of metal, and may be cut as shown at 412 such that the combined non-contact seal 400 is formed into segments. As shown in FIG. 4, there are portions of three adjacent segments 401, 402, 403, which come together to form the overall non-contact seal 400. Shoes 406 may be coupled to support ring 410 via arms 408. As shown, the cuts 412 may provide a gap that allows arms 408 to provide a spring force. Shoes 406 may move (e.g., radially) relative to support ring 410 via arms 408. In various embodiments, non-contact seal 400 may be similar to seal 214 of FIG. 2A.

Figure 2A:
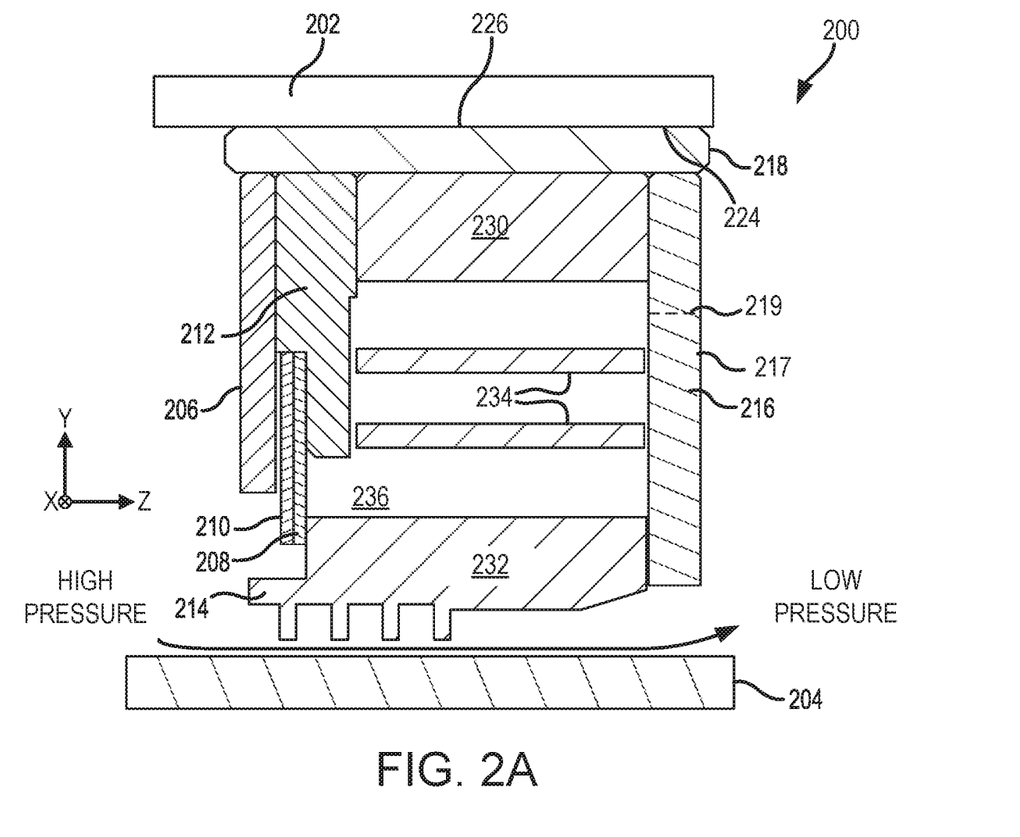
FIG. 2A illustrates a cross-section view of a seal arrangement installed to a static structure and adjacent a rotating member in a first position, in accordance with various embodiments.

With reference to FIG. 2A, a cross-section view of seal arrangement 200 in the installed position is illustrated, in accordance with various embodiments. Seal arrangement 200 may include a seal 214, a spacer 212, at least one secondary seal (i.e., first secondary seal 208 and/or second secondary seal 210), a secondary seal cover 206, a seal ring 216, and a carrier ring 218. In various embodiments, static structure 202 may circumferentially surround seal arrangement 200. In various embodiments, seal arrangement 200 may circumferentially surround static structure 202. In various embodiments, seal arrangement 200 may be snapped into static structure 202. In various embodiments, secondary seal cover 206 may be snapped into carrier ring 218. In various embodiments, seal ring 216 may be snapped into carrier ring 218. In various embodiments, seal ring 216 and carrier ring 218 are formed as two separate members. In various embodiments, seal ring 216 and carrier ring 218 are formed as a single, monolithic member. In various embodiments, spacer 212 may be snapped into carrier ring 218. In various embodiments, seal 214 may be snapped into carrier ring 218. In various embodiments, seal ring 216 may be snapped into carrier ring 218. Seal arrangement 200 may circumferentially surround rotating member 204. However, it is contemplated that the rotating member 204 may circumferentially surround the seal arrangement 200 or be axially seal arrangement 200 without departing from the scope of the present disclosure. In this regard, seal 214 may be configured to be coupled within rotating member 204, around rotating member 204, or axially adjacent rotating member 204. In this regard, the rotational axis of rotating member 204 may extend parallel the Z-direction and be located either above (in the positive Y-direction) or below (negative Y-direction) rotating member 204 in FIG. 2A. In various embodiments, seal 214 may comprise a non-contact seal. In this regard, seal 214 may be configured to not physically contact rotating member 204 during certain operational modes of an engine. Stated differently, seal 214 may be configured to maintain a gap between rotating member 204 and shoe 232. However, it should be noted that seal 214 may physically contact rotating member 204 during certain conditions, such as when the engine is off, or may momentarily contact rotating member 204. In this regard, the term "non-contact," as used herein, may refer to a seal which utilizes hydrostatic principles to reduce leakage. Furthermore, it is contemplated that the methods described herein may be used for any suitable seal for increasing seal clearance with respect to a rotating member during assembly without departing from the spirit and scope of the present disclosure.

Figure 3:
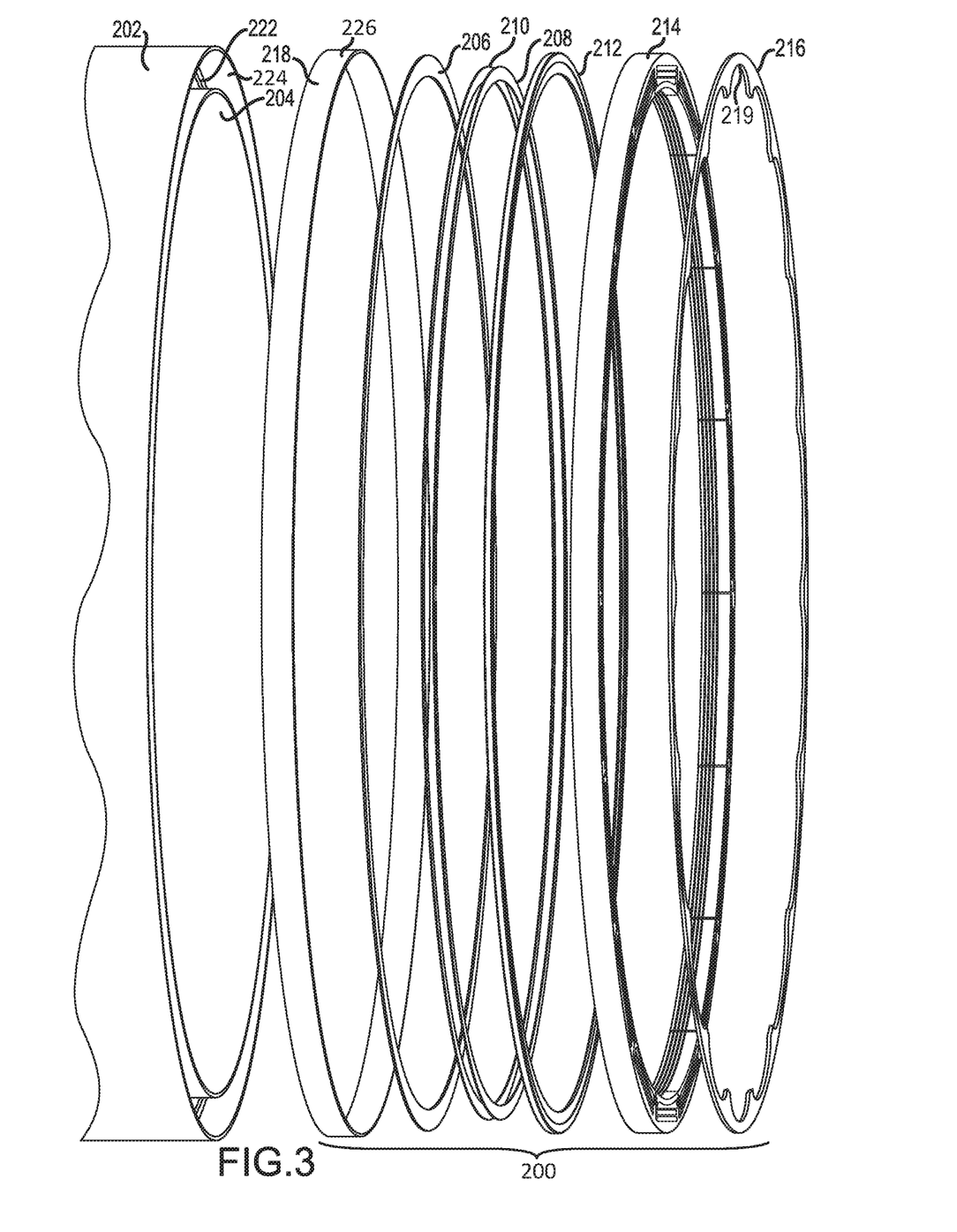
FIG. 3 illustrates an exploded perspective view of the seal arrangement of FIG. 2A, in accordance with various embodiments.

With combined reference to FIG. 2A and FIG. 3, carrier ring 218 may comprise a distal surface 226. Static structure 202 may comprise a proximal surface 224. Distal surface 226 may be in contact proximal surface 224. In various embodiments, carrier ring 218 may be snapped into static structure 202. In various embodiments, carrier ring 218 may be threaded into static structure 202.

As illustrated in FIG. 3, seal 214, spacer 212, first secondary seal 208, second secondary seal 210, secondary seal cover 206, seal ring 216, and/or carrier ring 218 may comprise an annular geometry. Seal 214, spacer 212, first secondary seal 208, second secondary seal 210, secondary seal cover 206, seal ring 216, and/or carrier ring 218 may be rings.

With combined reference to FIG. 1 and FIG. 2A, rotating member 204 may be mounted for rotation about engine central longitudinal axis X-X'. In various embodiments, rotating member 204 may comprise low speed spool 12. In various embodiments, rotating member 204 may comprise high speed spool 14. In various embodiments, rotating member 204 comprises any suitable rotating member incorporating a non-contact seal.

Figure 2B:
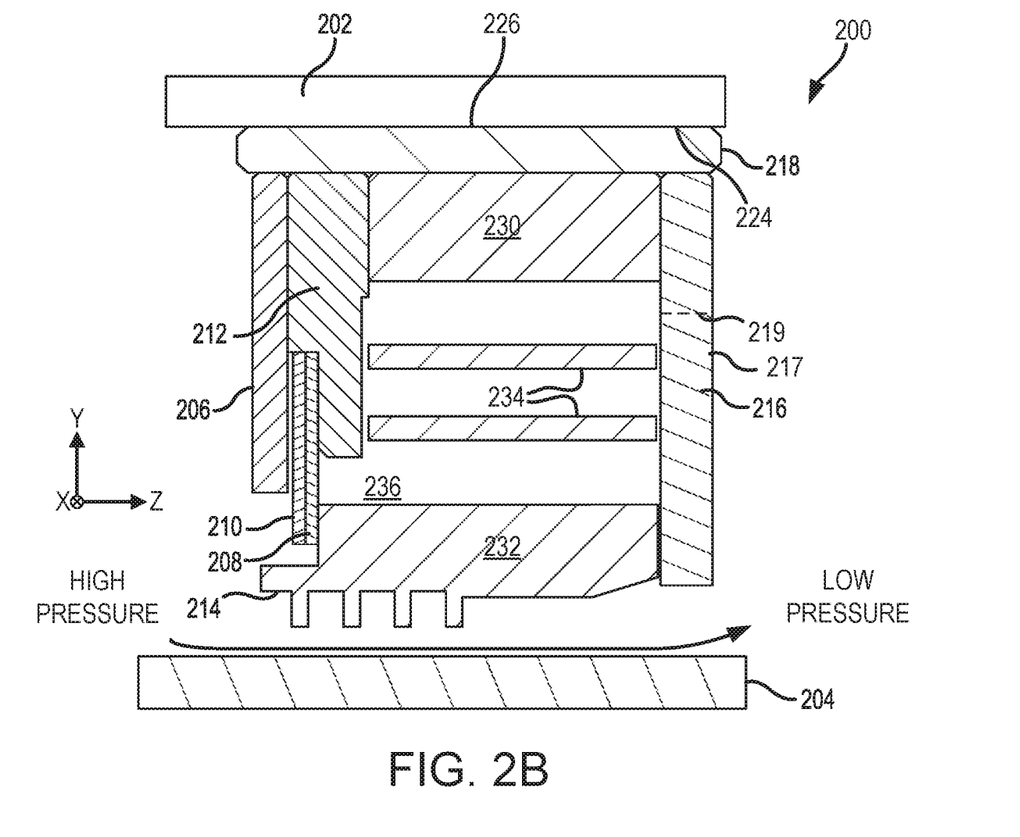
FIG. 2B illustrates the seal arrangement of FIG. 2A in a second position, in accordance with various embodiments.

With reference to FIG. 2A, a fluid, such as air for example, may travel from the high pressure side of seal arrangement 200 to the low pressure side of seal arrangement 200. First secondary seal 208 and second secondary seal 210 may prevent fluid from high pressure side of seal arrangement 200 from entering gap 236 of seal 214. In various embodiments, seal ring 216 may comprise a scalloped ring 217. Seal ring 216 may be made from a metal or metal alloy. In this regard, seal ring 216 may comprise a plurality of scalloped openings 219 which allow fluid from low pressure side of seal arrangement 200 into gap 236 of seal 214. As described in further detail in FIG. 4, seal 214 may comprise a shoe 232 attached to support ring 230 via arms 234. In this regard, it should be appreciated that the pressure gradient across seal 214 may act to move shoe 232 in the radial direction (Y-direction) with respect to support ring 230. Said movement may aid in preventing shoe 232 from contacting rotating member 204. In the illustrated embodiments, FIG. 2A illustrates seal 214 in a first position and FIG. 2B illustrates seal 214 in a second position, wherein with the shoe 232 of seal 214 is moved closer to support ring 230 in the second position than in the first position.

Figure 5A:
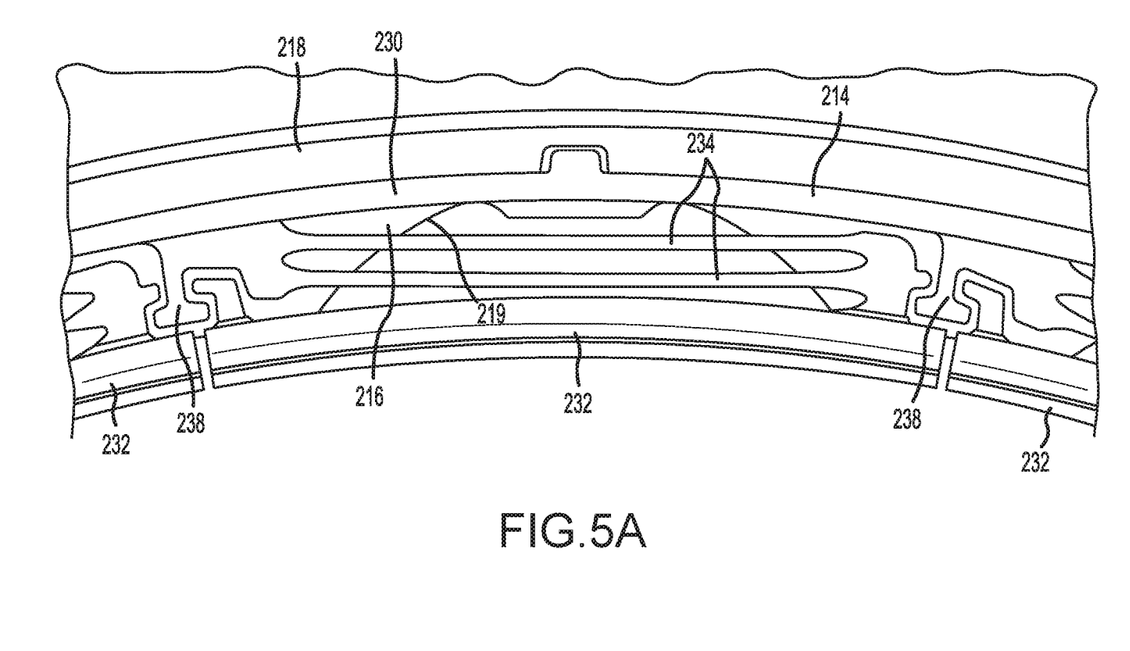
FIG. 5A illustrates a side view of a non-contact seal with the seal shoes in a neutral position, in accordance with various embodiments.

With reference to FIG. 5A, seal 214 is illustrated in an installed position with shoes 232 moved to an inboard position. In the inboard position, shoes 232 are moved radially inward with respect to support ring 230 in their neutral state. Shoes 232 may be moved to the inboard position in response to the spring-like bias of the arms 234. Seal ring 216 is disposed axially adjacent seal 214. Seal ring 216 may comprise scalloped openings 219. Seal ring 216 may be disposed adjacent seal 214. Seal 214 may comprise a plurality of stops 238 disposed between shoes 232. Stops 238 may extend radially inward from support ring 230. Stops 238 may comprise a "T" shape cross-section. Stops 238 may physically block each associated shoe 232 from moving too far inboard.

Figure 5B:
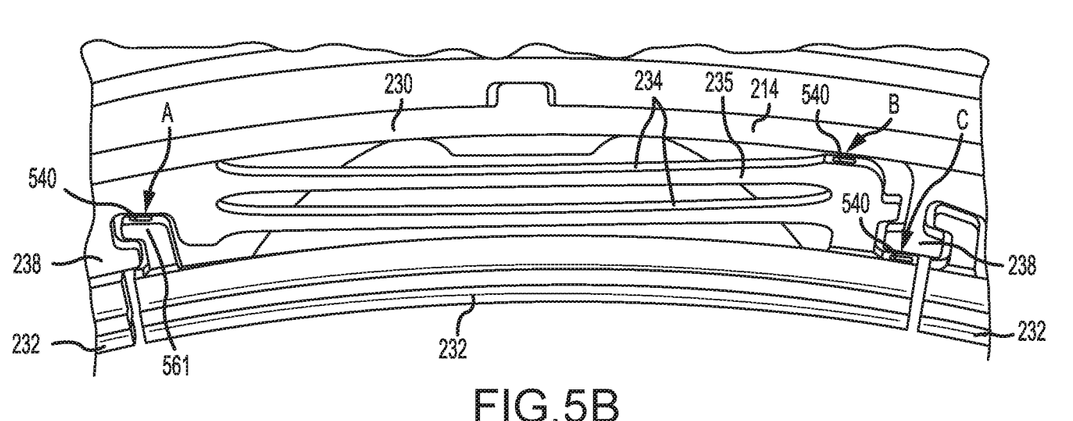
FIG. 5B illustrates a perspective view of the non-contact seal of FIG. 5A with an adhesive applied between a moveable member and a fixed member of the non-contact seal, in accordance with various embodiments.

With reference to FIG. 5B, seal 214 may be prepared for installation by applying an adhesive to at least one of location A, location B, and location C of seal 214. Location A is between a shoe tab 561 of shoe 232 and support ring 230. Location B is between outer arm 235 and support ring 230. Location C is between shoe 232 and stop 238. In this regard, adhesive 540 is applied between a moveable member (e.g., shoe tab 561, shoe 232, and/or outer arm 235) of seal 214 and a fixed member (e.g., support ring 230 and/or stop 238) of seal 214. In various embodiments, adhesive 540 is a cyanoacrolate adhesive. In various embodiments, adhesive 540 deteriorates (e.g., burns off) at an elevated temperature. In various embodiments, the elevated temperature is greater than 200° F. (93.3° C.)). In various embodiments, the elevated temperature is greater than 300° F. (148.9° C.)). For example, adhesive 540 may burn off during engine operation to allow the shoe 232 to move towards the inboard position and to allow movement of shoe 232 relative to support ring 230.

Figure 5C:
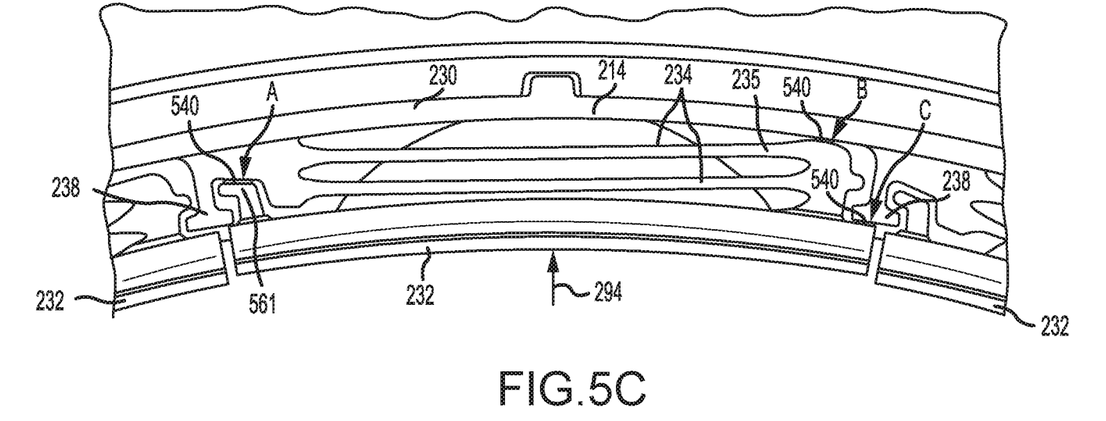
FIG. 5C illustrates a side view of the non-contact seal of FIG. 5A with a seal shoe moved to a clearance position and the adhesive securing the seal shoe in the clearance position, in accordance with various embodiments.

With reference to FIG. 5C, seal 214 may be further prepared for installation by applying a force 294 to shoe 232, thereby minimizing the gap between shoe 232 and support ring 230 at location A and location B, and closing the gap between shoe 232 and stop 238 at location C. In this manner, shoe 232 may be secured with respect to a static structure (e.g., support ring 230 and/or stop 238). In various embodiments, shoe 232 may be secured in this clearance position (i.e., clearance with respect to rotating member 204 of FIG. 2B) via the adhesive 540. Shoe 232 may be adhered in an outboard position, in accordance with various embodiments. After the adhesive 540 cures, force 294 may be removed and adhesive 540 may hold shoe 232 in the secured position. In this manner, shoe 232 may be held in the clearance position to aid in ease of installation of seal 214 over a rotating member (e.g., rotating member 204 of FIG. 2B). This process may be repeated for each remaining shoe 232 of seal 214.

In various embodiments, adhesive 540 is applied to seal 214 after the seal 214 has been installed into carrier ring 218 (see FIG. 2A) with seal ring 216 in the installed position immediately axially adjacent seal 214, as illustrated. In various embodiments, carrier ring 218 may be heated prior to being snapped onto seal 214 and/or seal ring 216. Thus, the adhesive 540 is applied to seal 214 after seal 214 and seal ring 216 are installed into carrier ring 218 so that the adhesive 540 is not dissolved during installation of seal 214 and/or seal ring 216, which may include heating carrier ring 218. Furthermore, in various embodiments, adhesive 540 may be applied to seal 214 after carrier ring 218 is installed into static structure 202 so that adhesive 540 is not dissolved during installation of carrier ring 218, which may include applying heat to static structure 202.

Figure 6:
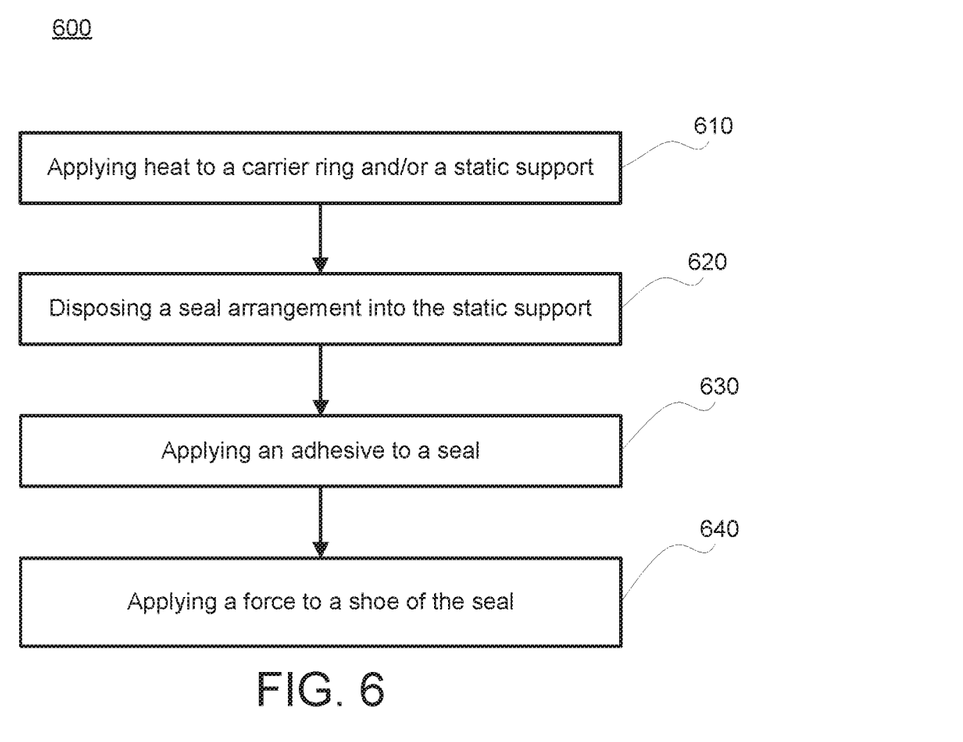
FIG. 6 illustrates a method for assembling a seal arrangement, in accordance with various embodiments.

With reference to FIG. 6, a method 600 for assembling a seal arrangement is provided, in accordance with various embodiments. Method 600 includes applying heat to a carrier ring and/or a static support (step 610). Method 600 includes disposing a seal arrangement into the static support (step 620). Method 600 includes applying an adhesive to the seal (step 630). Method 600 includes applying a force to a shoe of the seal (step 640).

With combined reference to FIG. 2A and FIG. 6, step 610 may include applying heat to carrier ring 218 and/or static structure 202. Step 620 may include disposing carrier ring 218 into static structure 202. Step 620 may include disposing seal 214 into carrier ring 218 and/or static structure 202. Step 620 may include disposing seal ring 216 into carrier ring 218 and/or static structure 202. Seal 214 and seal ring 216 may be moved axially with respect to carrier ring 218 and/or static structure 202 during step 620. With combined reference to FIG. 5B and FIG. 6, step 630 may include applying an adhesive to seal 214 at location A, location B, and/or location C. Step 630 may be performed after seal 214 and carrier ring 218 have cooled down (e.g., to room temperature) from step 610. With combined reference to FIG. 5C and FIG. 6, step 640 may include applying a force 294 to shoe 232. Step 640 may include applying a force 294 to shoe 232 in a radial direction, in accordance with various embodiments. Step 640 may include applying a force 294 to shoe 232 in a radially outward direction, in accordance with various embodiments. Stated differently, force 294 may be applied to shoe 232 in a distal direction, in accordance with various embodiments. Step 640 may be performed by hand or using a tool. A rotating member (e.g., see rotating member 204 of FIG. 2A) may be disposed to extend through seal 214 after step 640.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal for use in a gas turbine engine between a static structure and a rotating member, comprising:
   a support ring for attachment to the static structure;
   a shoe coupled to the support ring via an arm, and for facing the rotating member; and
   an adhesive disposed between the shoe and the support ring,
   wherein the adhesive secures the shoe with respect to the support ring against an inboard spring force provided by the arm, and
   wherein the adhesive is configured to burn off at an elevated temperature to allow the shoe to move towards an inboard position.

2. The seal of claim 1, wherein the adhesive is disposed between the arm and the support ring.

3. The seal of claim 1, further comprising a stop extending from the support ring, wherein the adhesive is disposed between the shoe and the stop.

4. The seal of claim 1, further comprising a shoe tab extending from the shoe, wherein the adhesive is disposed between the shoe tab and the support ring.

5. The seal of claim 1, wherein the adhesive is a cyanoacrolate adhesive.

6. A seal arrangement of a gas turbine engine, comprising:
   a static structure;
   a rotating member;
   a carrier ring attached to the static structure;
   a seal coupled to the carrier ring, the seal comprising a support ring and a shoe coupled to the support ring via an arm, the shoe facing the rotating member;
   a seal ring coupled to the carrier ring and axially adjacent the seal; and
   an adhesive disposed between the support ring and the shoe,
   wherein the adhesive secures the shoe with respect to the support ring against an inboard spring force provided by the arm, and
   wherein the adhesive is configured to burn off at an elevated temperature to allow the shoe to move towards an inboard position.

7. The seal arrangement of claim 6, wherein the adhesive is disposed between the arm and the support ring.

8. The seal arrangement of claim 6, further comprising a stop extending from the support ring, wherein the adhesive is disposed between the shoe and the stop.

9. The seal arrangement of claim 6, further comprising a shoe tab extending from the shoe, wherein the adhesive is disposed between the shoe tab and the support ring.

10. The seal arrangement of claim 6, wherein the adhesive is a cyanoacrolate adhesive.

11. A method for assembling a seal arrangement in a gas turbine engine having a static structure and a rotating member, the method comprising:
    applying an adhesive to a seal; and
    applying a force to a shoe of the seal
    wherein the seal comprises:
       a support ring attached to the static structure;
       the shoe coupled to the support ring via an arm, the shoe facing the rotating member; and
       the adhesive disposed between the shoe and the support ring,
    wherein the adhesive secures the shoe with respect to the support ring against an inboard spring force provided by the arm, and
    wherein the adhesive is configured to burn off at an elevated temperature to allow the shoe to move towards an inboard position.

12. The method of claim 11, further comprising removing the force from the shoe, wherein the adhesive secures the shoe with respect to the static structure in response to the force being removed.

13. The method of claim 11, wherein the seal comprises a stop extending from the support ring, and wherein the adhesive is applied between the shoe and the stop.

14. The method of claim 11, wherein the adhesive is applied between the arm and the support ring.

15. The method of claim 11, wherein the adhesive is applied between the shoe and the support ring.

16. The method of claim 11, further comprising: applying heat to at least one of a carrier ring and a static support piece; and disposing the seal arrangement into the at least one of the carrier ring and the static support piece, wherein the heat is applied to at least one of the carrier ring and the static support piece prior to applying the adhesive to the seal.

17. The method of claim 11, further comprising disposing the rotating member adjacent the seal.

* * * * *